US008671536B2

(12) United States Patent
Spanos et al.

(10) Patent No.: US 8,671,536 B2

(45) Date of Patent: Mar. 18, 2014

(54) APPARATUS FOR INSTALLING A TURBINE CASE

(75) Inventors: Charles V. Spanos, Mauldin, SC (US); John William Herbold, Fountain Inn, SC (US); Kevin Scott Peterson, Clifton Forge, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/415,009

(22) Filed: Mar. 8, 2012

(65) Prior Publication Data

US 2013/0232788 A1 Sep. 12, 2013

(51) Int. Cl.

| | |
|---|---|
| ***B21D 39/02*** | (2006.01) |
| ***B23Q 3/00*** | (2006.01) |
| ***B23P 19/04*** | (2006.01) |
| ***B25B 27/14*** | (2006.01) |
| ***B21K 25/00*** | (2006.01) |
| ***B23Q 7/00*** | (2006.01) |
| ***F01D 25/28*** | (2006.01) |
| *F04D 29/40* | (2006.01) |
| *F01D 25/24* | (2006.01) |
| *B23P 6/00* | (2006.01) |

(52) U.S. Cl.

USPC ............. 29/281.1; 29/244; 29/281.5; 29/463; 29/464; 29/559; 29/889.1; 29/889.2; 415/214.1; 415/213.1; 415/126

(58) Field of Classification Search

USPC ............. 29/244, 281.5, 281.6, 463, 464, 235, 29/559, 889.1, 889.2; 415/214.1, 213.1, 415/126

See application file for complete search history.

(56) References Cited

U.S. PATENT DOCUMENTS

| | | | | |
|---|---|---|---|---|
| 626,427 | A * | 6/1899 | Jones | 269/218 |
| 3,828,403 | A * | 8/1974 | Perrin et al. | 24/270 |
| 4,491,307 | A * | 1/1985 | Ellefson | 269/55 |
| 4,567,784 | A * | 2/1986 | Hambric | 74/467 |
| 5,165,160 | A * | 11/1992 | Poncelet | 29/464 |
| 5,666,711 | A * | 9/1997 | Pfeiffer | 29/272 |
| 6,044,686 | A * | 4/2000 | Dischler | 72/402 |
| 6,095,021 | A * | 8/2000 | Epperson | 82/70.2 |
| 6,142,165 | A * | 11/2000 | Wartel et al. | 137/15.13 |
| 6,405,411 | B1 * | 6/2002 | Allemann et al. | 24/19 |
| 6,450,491 | B1 * | 9/2002 | McEvoy | 269/118 |
| 7,197,803 | B2 * | 4/2007 | Kemsley et al. | 29/407.05 |
| 7,290,761 | B2 * | 11/2007 | Siegel | 269/266 |
| 7,624,488 | B2 * | 12/2009 | Lum et al. | 29/281.5 |
| 7,891,067 | B2 * | 2/2011 | Muhlenbruck | 29/235 |
| 8,336,177 | B2 * | 12/2012 | Vernasca et al. | 29/237 |
| 8,474,806 | B2 * | 7/2013 | Orgeron | 269/218 |
| 8,496,238 | B1 * | 7/2013 | Orgeron | 269/270 |
| 8,529,199 | B2 * | 9/2013 | Lore et al. | 415/127 |
| 2002/0197147 | A1 | 12/2002 | Kawai et al. | |

(Continued)

*Primary Examiner* — Essama Omgba

*Assistant Examiner* — Darrell C Ford

(74) *Attorney, Agent, or Firm* — Ernest G. Cusick; Frank A. Landgraff

(57) ABSTRACT

An apparatus for installing a turbine casing including a first drive subassembly and a member coupled to the first drive subassembly configured for engaging a first segment of the turbine casing. The apparatus may also include a second member coupled to the second drive subassembly configured for engaging the first segment of the turbine casing. The apparatus may be provided with a first retainer connected to the first member and configured for engaging a second segment of the turbine casing, and a second retainer connected to the second member and configured for engaging the second segment of the turbine casing.

11 Claims, 6 Drawing Sheets

(56) References Cited

U.S. PATENT DOCUMENTS

2003/0120415 A1 6/2003 Seeley et al.
2010/0187740 A1* 7/2010 Orgeron ........................ 269/218
2010/0300172 A1* 12/2010 Klever ............................ 72/257
2011/0023677 A1* 2/2011 Rundell et al. .................. 83/459
2012/0213937 A1* 8/2012 LaValley et al. .............. 427/401
2013/0185926 A1* 7/2013 Williams et al. ................ 29/559
2013/0212852 A1* 8/2013 Dagenais ..................... 29/281.1
2013/0247359 A1* 9/2013 Schoening ...................... 29/559

* cited by examiner

APPARATUS FOR INSTALLING A TURBINE CASE

TECHNICAL FIELD

The subject matter disclosed herein relates generally to methods and devices to facilitate the installation of turbine casing segments, and more particularly, to a drive assembly that engages the horizontal joint flange counter bores of the turbine casing segments.

BACKGROUND

Gas turbines include a rotor and rotating disks that are attached to the rotor, and airfoils that are positioned at the outer diameter of the disks. These components are surrounded by a turbine casing. Typically, a turbine casing is made in two segments, an upper turbine casing segment and a lower turbine casing segment, split on a horizontal centerline to facilitate assembly and provide access to the rotor and internal stationary portions of the turbine. The segments are normally connected through a bolted flange at their horizontal joint and act to contain the working fluid while maintaining the working fluid in intimate contact with the blade elements. The upper turbine casing segment may be installed between a compressor discharge casing (CDC) and exhaust casing vertical joints during gas turbine maintenance. The fit for the casing is tight and the structure is hung as it is installed. There are occasions, including in the manufacturing phase and during maintenance when the upper casing segment will require lifting. To facilitate lifting, the upper casing segment is fitted with lifting lugs to allow the component to be raised and moved.

The level continuous installation of the upper casing segment is a difficult task. The installation is usually carried out without specialized tools and generally requires significant manpower. The improper installation of the upper casing segment may cause quality issues such as galling and damage to the flange, distortion to the casing and bolting, as well as improper crane loading.

BRIEF DESCRIPTION OF THE INVENTION

In accordance with one exemplary non-limiting embodiment, the invention relates to an apparatus for installing a turbine casing having a first drive subassembly and a member coupled to the first drive subassembly configured for engaging a first segment of the turbine casing. The apparatus also includes a second member coupled to a second drive subassembly configured for engaging the first segment of the turbine casing. The apparatus is provided with a first retainer connected to the first member and configured for engaging a second segment of the turbine casing, and a second retainer connected to the second member and configured for engaging the second segment of the turbine casing.

In another embodiment a method for aligning a first casing segment with a second casing segment includes disposing a first pair of members through a first pair of bore holes in a flange on a first side of the first casing segment. The method includes disposing a second pair of members through a second pair of bore holes in a flange on a second side of the first casing segment, and connecting the first pair of rods and the second pair of rods to the second casing segment. The method also provides for displacing the first casing segment by displacing the first pair of members and the second pair of members.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
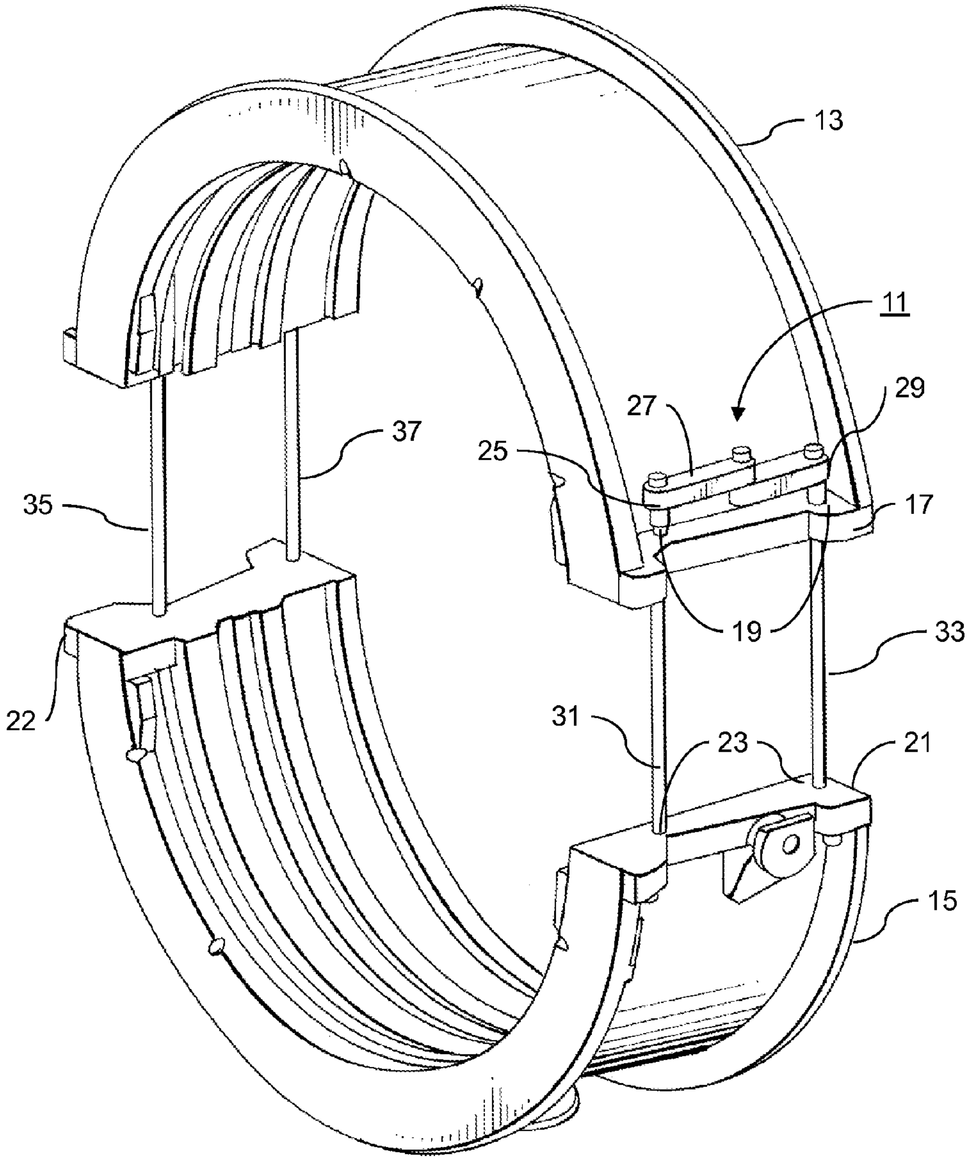
FIG. 1 is a top right side perspective view of a turbine casing and an embodiment of a casing installation apparatus.
Figure 2:
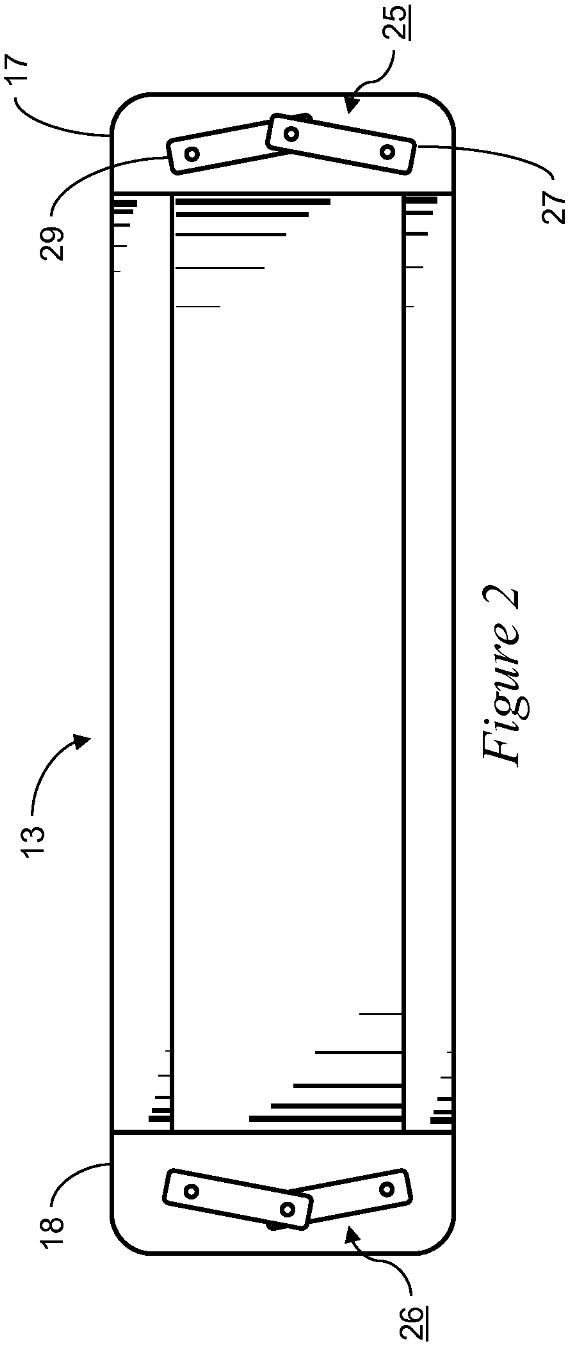
FIG. 2 is a top view of an illustrative embodiment of a casing installation apparatus.

Illustrated in FIGS. 1 and 2 is a casing installation apparatus 11 for installing an upper casing segment 13 on a lower casing segment 15. In one embodiment, the upper casing segment 13 may include a right upper casing flange 17 and a left upper casing flange 18. The right upper casing flange 17 may have two right upper casing counter bores 19. The left upper casing flange 18 may have two left upper casing counter bores 20. Although in the preceding embodiment, the right upper casing flange 17 and the left upper casing flange 18 are each described as having two counter bores, as may be apparent to one of ordinary skill in the art, a single bore or multiple bores may be used on each side of the upper casing segment 13. The lower casing segment 15 may include a right lower casing flange 21 with two right lower casing counter bores 23 and a left lower casing flange 22 with two left lower casing counter bores (not shown).

In one embodiment, the casing installation apparatus 11 may include a right drive assembly 25 having two subassemblies, including a first drive arm 27 and a second drive arm 29. The first drive arm 27 may be coupled to a first right connecting member 31, such as a beam or rod, and the second drive arm 29 may be coupled to a second right connecting member 33. A left drive assembly 26 may be similarly coupled to a first left connecting member 35 and a second left connecting member 37. In one embodiment the first right connecting member 31, the second right connecting member 33, the first left connecting member 35 and the second left connecting member 37 may be threaded rods. Although the preceding embodiment describes a right drive assembly 25 and a left drive assembly 26 each with two subassemblies, in another embodiment a single arm may be used.

Figure 3:
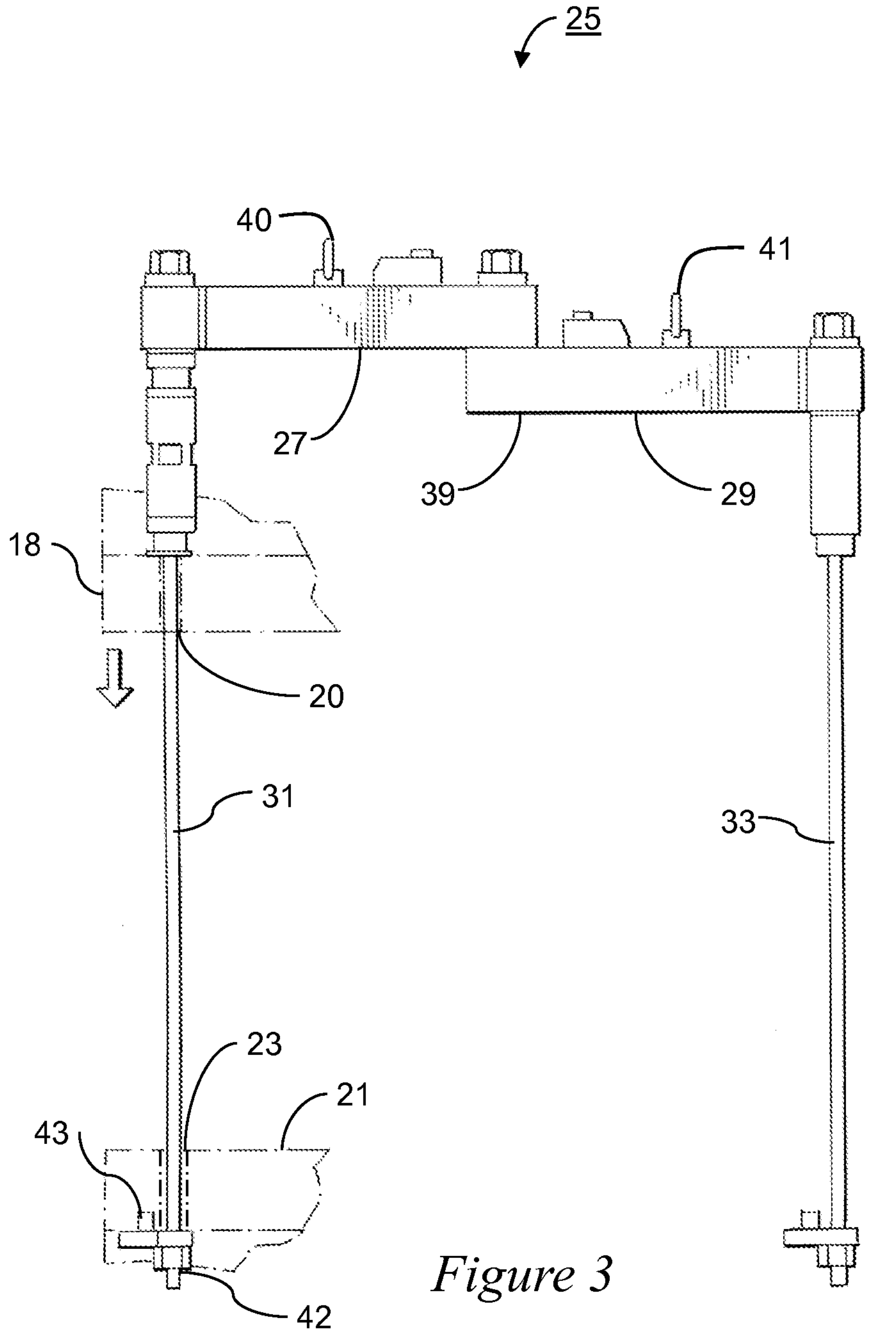
FIG. 3 is a side view of an illustrative embodiment of a casing installation apparatus.

Illustrated in FIG. 3 is an embodiment of the right drive assembly 25 showing the first drive arm 27 and the second drive arm 29 coupled at a pivot point 39. The first drive arm 27 may be provided with a first swivel hoisting ring 40 and the second drive arm 29 may be provided with a second swivel hoisting ring 41. The first swivel hoisting ring 40 and the second swivel hoisting ring 41 may be used to position the drive assembly 25 relative to the upper casing segment 13 and the lower casing segment 15. The first right connecting member 31 is coupled to the first drive arm 27 and is disposed through one of the lower casing counter bores 23. The first right connecting member 31 may be secured to the right lower casing flange with a casing nut 42 and a doweled retainer 43.

Figure 4:
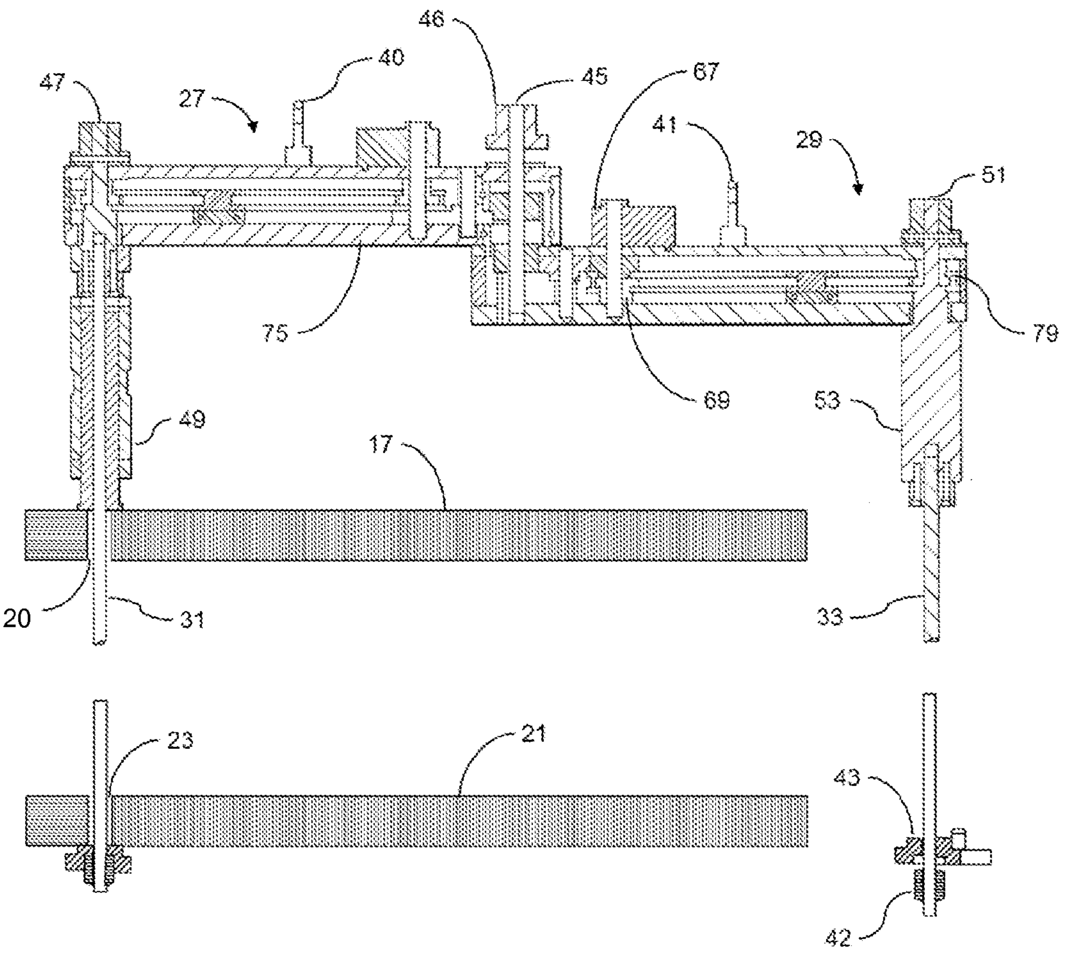
FIG. 4 is a vertical cross-section view of an illustrative embodiment of a casing installation apparatus.

Illustrated in FIG. 4 are the internal components of an embodiment of the drive assembly 25. In this embodiment, the first drive arm 27 and the second drive arm 29 are pivotally coupled with a shaft 45. The shaft 45 may be provided with a shaft drive nut 46 that may be engaged with a ratchet or electric drill (not shown). The first drive arm 27 may be provided with a first drive nut 47 that may be attached to an adjustable collar assembly 49 that is in turn attached to the first right connecting member 31. In this embodiment, the first right connecting member 31 may be a threaded rod. The first drive nut 47 may be engaged with a ratchet or electric drill (not shown) and used to rotate the first right connecting member 31. The second drive arm 29 may similarly be provided with a second drive nut 51 and a second coupling collar assembly 53 By enabling the first drive arm 27 to pivot with respect to the second drive arm 29, the left drive assembly 26 and right drive assembly 25 may be positioned to accommodate more than one turbine frame size.

Figure 5:
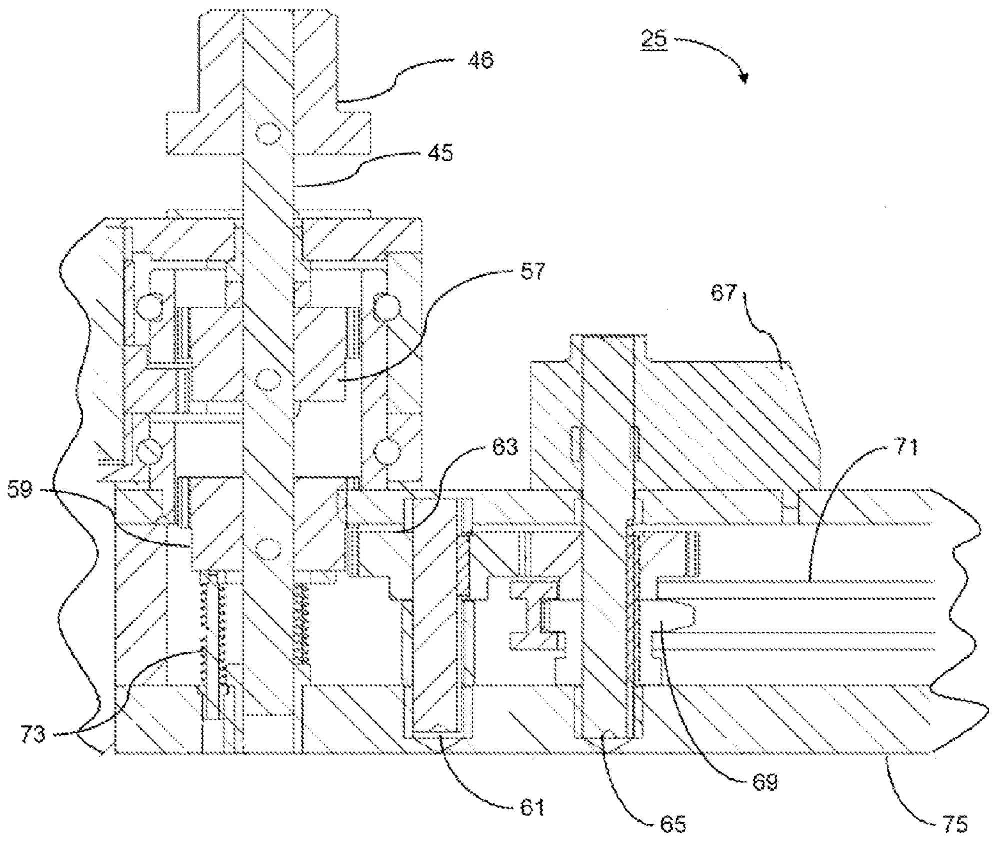
FIG. 5 is a fragmentary view of a detail of FIG. 4.

FIG. 5 is a fragmentary view of a detail of the embodiment illustrated in FIG. 4, showing the details of the internal components associated with the second drive arm 29. Shaft 45 may be connected to an upper spur gear 57 and a lower spur gear 59. A shaft 61 in the second drive arm 29 may be provided with a spur gear 63 that engages with the lower spur gear 59. A corresponding shaft (not shown) in the first drive arm 27 may be provided with a corresponding spur gear (not shown) that engages the upper spur gear 57. Spur gear 63 may drive a spur gear 64 that is coupled with a spindle 65. The spindle 65 may be used to drive a counter mechanism (not shown) in a position indicator 67 disposed on the second drive arm 29. Position indicator 67 may be one of a variety of position indicators that are commercially available, such as those manufactured by SIKO Products USA. Spindle 65 may also drive a sprocket 69 which in turn drives a chain belt 71. Shaft 45 is designed to allow vertical displacement. A spring 73 may be provided to bias the shaft 45 and spur gear 59 to be engaged with spur gear 63. The shaft 45 may be displaced vertically to disengage the lower spur gear 59 from spur gear 63. The shaft 61 and spindle 65 may be supported by a housing 75. Although in the preceding embodiment, the first drive arm 27 and the second drive arm 29 are described as including a combination of a chain belt 71 and spur gears (including upper spur gear 57, lower spur gear 59, and spur gear 63), it would be apparent to one of ordinary skill in the art to provide a subassembly including any combination of components that can be used to transfer torque to or displace the connecting members (i.e. first right connecting member 31, second right connecting member 33, first left connecting member 35, and second left connecting member 37). These components may include other types of gears, belts, ratchets, cams, electric motors and the like. Additionally, although the preceding description is directed to the second drive arm 29 similar components may be used with regard to the first drive arm 27.

Figure 6:
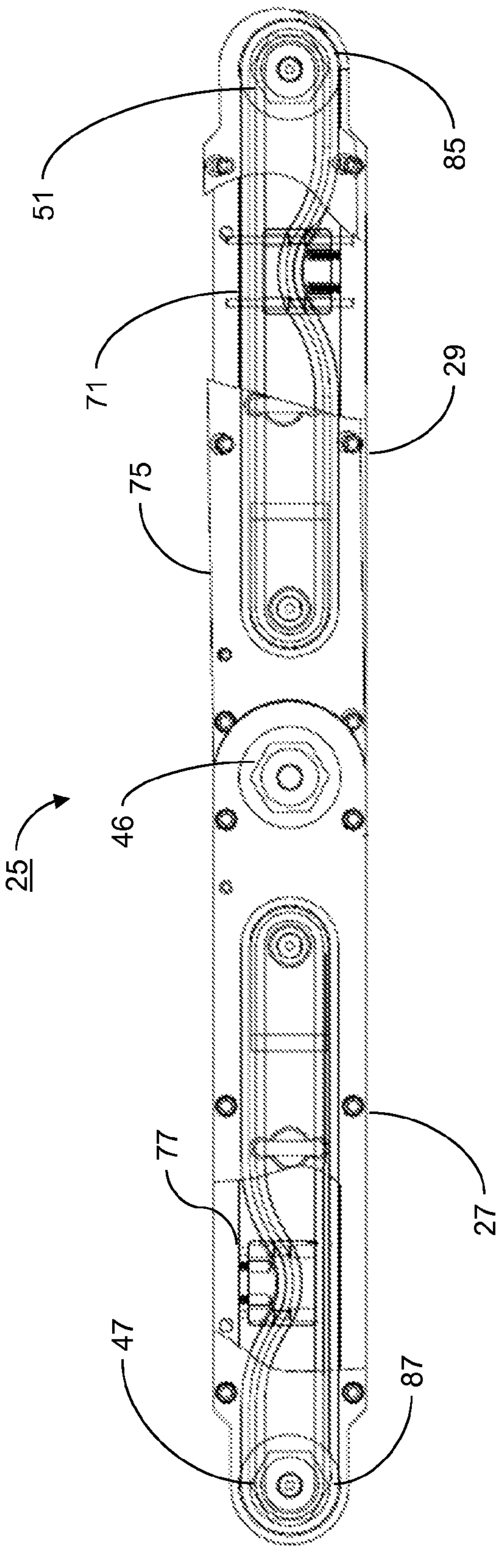
FIG. 6 is a cutaway top view of an embodiment of a drive assembly.

FIG. 6 is a partial cutaway top view of the right drive assembly that illustrates one mode of operation of an embodiment of the right drive assembly 25 or the left drive assembly 26. The right drive assembly 25 may be operated by engaging the shaft drive nut 46 with a ratchet or electric drill. The shaft 45 is connected with the upper spur gear 57 and lower spur gear 59 and those components will transfer torque applied to the shaft drive nut 46 to the chain belt 71 that will in turn drive sprocket 85 and sprocket 87. Sprocket 85 and sprocket 87 may be attached to the first right connecting member 31 and the second right connecting member 33, thereby transferring torque applied to the shaft drive nut 46 to the first right connecting member 31 and the second right connecting member 33. First right connecting member 31 and the second right connecting member 33 each act as a screw interface with casing nut 42 and doweled retainer 43 to draw the upper casing segment 13 and lower casing segment 15 together. This ability allows a single operator to draw the upper casing segment 13 and the lower casing segment 15 together thereby reducing the manpower needed to perform the operation, and improving quality.

In another mode of operation, the shaft 45 may be lifted thereby disengaging upper spur gear 57 and lower spur gear 59. Torque may be applied to the first drive nut 47 to raise or lower the first right connecting member 31 independently from the second right connecting member 33. The ability to independently rotate or displace a rod (e.g. first right connecting member 31) allows a single operator to level the upper casing segment 13 during installation thereby reducing the manpower needed to perform the operation, and improving quality. The use of the casing installation apparatus 11 may also result in maintenance labor cost reduction and the reduction of the time that a turbine is down for maintenance.

Although in the embodiment described above the right drive assembly 25 and the left drive assembly 27 are described as having spur gears (spur gear 59, 63, etc.) sprockets (e.g. sprocket 69) and a chain belt 71 it would be apparent to one of ordinary skill in the art to substitute other mechanical components or means for displacing the connecting members to accomplish the same result. For example, in one embodiment a rack and pinion mechanism may be substituted for spur gears and threaded rod. Other types of gears such as helical, internal ring, helical rack, face, worm, bevel, spiral and screw gears, among others may be used to displace the connecting members (first right connecting member 31, second right connecting member 33, first left connecting member 35, and second left connecting member 37). Alternately an internal electric motor, magnetic linear system or hydraulic mechanism may be used to displace the connecting members.

An embodiment of a method of installing an upper casing segment 13 to a lower casing segment 15 may include disposing the right drive assembly 25 and attached first right connecting member 31 and second right connecting member 33 through the right upper casing counter bores 19. The first right connecting member 31 and second right connecting member 33 may then be inserted through the corresponding lower casing counter bore(s) 23, and secured to the right lower casing flange 21 with the casing nut 42 and the doweled retainer 43. The corresponding procedure may then be used to secure left drive assembly 26 and associated first left connecting member 35 and second left connecting member 37 to the left lower casing flange 22. The operator may then bring the upper casing segment 13 together with the lower casing segment 15 by using a ratchet or electric drill to apply torque to the shaft drive nut 46. The operator may also level the upper casing segment 13 by first displacing the shaft thereby disengaging the upper spur gear 57 and lower spur gear 59. The operator may then use a ratchet or electric drill to rotate one of the connecting members (first right connecting member 31, second right connecting member 33, first left connecting member 35 or second left connecting member 37). Position indicator 67 may be used to define and compare the relative position of the right upper casing flange 17 and left upper casing flange 18 to the horizontal.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed:

1. An apparatus for installing a turbine casing comprising: a first drive subassembly;

a second drive subassembly pivotally connected to the first drive subassembly;

a first member coupled to the first drive subassembly configured for engaging a first segment of the turbine casing;

a second member coupled to the second drive subassembly configured for engaging the first segment of the turbine casing;

a first retainer connected to the first member and configured for engaging the second segment of the turbine casing;

a second retainer connected to the second member and configured for engaging the second segment of the turbine casing;

a first drive mechanism coupled to the first member and adapted to displace the first member;

a second drive mechanism coupled to the second member and adapted to displace the second member; and a coupling component connecting the first drive subassembly with the second drive subassembly and operable in one of two operating positions wherein in a first operating position the coupling component is capable of displacing the first member and the second member simultaneously, and in a second operating position the coupling component cannot displace the first member and the second member, wherein the coupling component comprises:

a displaceable shaft that pivotally connects the first drive subassembly to the second drive subassembly;

a first gear affixed to the displaceable shaft;

a first torque transfer mechanism disposed in the first drive subassembly, the first torque transfer mechanism being engaged to the first gear when the displaceable shaft is in a first position and being disengaged from the first gear when the displaceable shaft is in a second position;

a second gear affixed to the displaceable shaft; and a second torque transfer mechanism disposed in the second drive subassembly, the second torque transfer mechanism being engaged to the second gear when the displaceable shaft is in the first position and being disengaged from the second gear when the displaceable shaft is in the second position.

2. The apparatus of claim 1 wherein the first drive subassembly comprises a first coupling collar attached to the first member.

3. The apparatus of claim 1 wherein the second drive subassembly comprises a second coupling collar attached to the second member.

4. The apparatus of claim 1 wherein the first torque transfer mechanism is coupled to the first member and is adapted to displace the first member.

5. The apparatus of claim 4 wherein the first torque transfer mechanism comprises a first drive belt disposed in the first drive subassembly, the first drive belt being coupled to the first member.

6. The apparatus of claim 5 wherein the first drive belt is adapted to displace the first member.

7. The apparatus of claim 4 wherein the second torque transfer mechanism comprises a second drive belt disposed in the second drive subassembly the second drive belt being coupled to the second member.

8. The apparatus of claim 7 wherein the second drive belt is adapted to displace the second member.

9. The apparatus of claim 1 wherein the second torque transfer mechanism is coupled to the second member and is adapted to displace the second member.

10. The apparatus of claim 1 further comprising a first position indicator coupled to the first drive subassembly.

11. The apparatus of claim 10 further comprising a second position indicator coupled to the second drive subassembly.

* * * * *